US012060806B1

(12) United States Patent
McCaffrey

(10) Patent No.: US 12,060,806 B1
(45) Date of Patent: Aug. 13, 2024

(54) BLOCKER ASSEMBLY FOR TANGENTIAL ONBOARD INJECTORS

(71) Applicant: RTX Corporation, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/450,755

(22) Filed: Aug. 16, 2023

(51) Int. Cl.
*F01D 25/32* (2006.01)
*F01D 5/08* (2006.01)

(52) U.S. Cl.
CPC ............. *F01D 25/32* (2013.01); *F01D 5/081* (2013.01); *F05D 2260/201* (2013.01); *F05D 2260/607* (2013.01)

(58) Field of Classification Search
CPC .......... F01D 25/08; F01D 25/12; F01D 25/14; F01D 25/24; F01D 25/32; F01D 5/081; F01D 5/082; F05D 2260/201; F05D 2260/607
See application file for complete search history.

(56) References Cited

U.S. PATENT DOCUMENTS

| | | | | |
|---|---|---|---|---|
| 4,466,239 | A * | 8/1984 | Napoli | F02C 7/18 415/177 |
| 5,402,636 | A | 4/1995 | Mize et al. | |
| 11,371,700 | B2 | 6/2022 | Prenter et al. | |
| 11,511,222 | B2 | 11/2022 | Gover | |
| 2013/0192257 | A1 | 8/2013 | Horine et al. | |
| 2014/0290254 | A1 * | 10/2014 | Manning | F01D 25/32 60/752 |
| 2016/0123154 | A1 * | 5/2016 | Manning | F01D 5/147 416/90 R |
| 2021/0047953 | A1 * | 2/2021 | Gover | F02M 23/14 |
| 2022/0316357 | A1 | 10/2022 | Jarrossay et al. | |

* cited by examiner

*Primary Examiner* — Elton K Wong
(74) *Attorney, Agent, or Firm* — CANTOR COLBURN LLP

(57) ABSTRACT

Tangential onboard injector assemblies include a TOBI and a TOBI blocker assembly arranged upstream of an inlet of the TOBI. The TOBI blocker assembly includes a first blocker plate upstream from the inlet and defining a blocker cavity between the first blocker plate and the TOBI. The first blocker plate includes a blocking portion and a filter portion to permit airflow therethrough. A second blocker plate is arranged within the blocker cavity to obstruct a flow of air containing particulate matter and a gap is present between the second blocker plate and the first blocker plate to permit flow of air around the second blocker plate. A third blocker plate is arranged downstream from the second blocker plate within the blocker cavity and includes a feed hole. Air within a region between the second blocker plate and the third blocker plate flows through the feed hole into the TOBI.

20 Claims, 6 Drawing Sheets

BLOCKER ASSEMBLY FOR TANGENTIAL ONBOARD INJECTORS

BACKGROUND

The subject matter disclosed herein generally relates to components for turbine engines and, more particularly, to improved debris control and debris blocking for tangential onboard injectors (TOBI).

Gas turbine engines may have particle accumulation therein, e.g., sand, dust, etc. The accumulation of such particles and damage caused thereby may lead to durability issues and/or other impacts may result, which may result in reduced part-life and/or damage to various components of a gas turbine engine. One result of particle accumulation may be holes within the engine may plug or clog due to a build-up of particles within the hole. Plugging of air flow paths may result in reduced cooling effectiveness, and thus higher temperatures. Such higher temperatures may result in reduced part-life. Further, if the build-up of particles increases and particulate matter agglomeration can dislodge and be pulled or forced through and along cooling flow paths. Such particulate matter may impact various components in the flow stream and cause damage thereto.

For example, small particles may not get rejected in the fan and compressor stages of the engine, and thus may be present in secondary flow systems of the engine, such as cooling flow sourced from the fan and/or compressor stages. The ingested particulate matter may be foreign object debris and/or dirt, dust, and the like (e.g., external to the engine). Further, internal particulate matter may be generated during use of the engine, such as domestic object debris, which may include rub-strip material that is worn away during operation of the engine.

One point of particle accumulation may be proximal to and/or in a tangential on-board injector ("TOBI") that is arranged upstream in a flow direction from a turbine section of the engine. The TOBI is typically located in an inner region of the engine, adjacent to a hot flowpath. The hot flowpath creates an annulus and the TOBI resides inside the annulus. The TOBI may be shielded from the hot flowpath by structures such as combustion chamber walls, vane platforms, and blade platforms. The TOBI may provide a cooling flow of air to the turbine section to provide cooling to blades, vanes, and other components of a turbine section of the engine. Particles in the upper part of the engine (e.g., above an engine axis) may fall and/or collect near the TOBI due to gravity and may collect near the TOBI entrance. In the lower part of the engine (e.g., below an engine axis), particulate matter may be carried by the cooling flow. Thus, it may be advantageous to design a TOBI having an ability to prevent particles from being supplied therethrough.

SUMMARY

According to some embodiments of the present disclosure, tangential onboard injectors (TOBI) assemblies are provided. The TOBI assemblies include a TOBI having an inlet and an outlet and a TOBI blocker assembly arranged upstream from the TOBI. The TOBI blocker assembly includes a first blocker plate mounted upstream from the inlet of the TOBI and defining a blocker cavity between the first blocker plate and the inlet of the TOBI, the first blocker plate comprising a blocking portion and a filter portion, wherein air is blocked from entering the blocker cavity through the blocking portion and permitted to enter the blocker cavity through the filter portion, a second blocker plate arranged within the blocker cavity to obstruct a flow of air containing particulate matter flowing from the filter portion to the inlet of the TOBI, wherein a gap is present between the second blocker plate and the first blocker plate to permit flow of air around the second blocker plate to the TOBI, and a third blocker plate arranged downstream from the second blocker plate and within the blocker cavity, the third blocker plate comprising at least one feed hole, wherein air within a region between the second blocker plate and the third blocker plate will flow through the at least one feed hole and into the TOBI.

In addition to one or more of the features described above, or as an alternative, further embodiments of the TOBI assemblies may include that the filter portion comprises a plurality of filter holes.

In addition to one or more of the features described above, or as an alternative, further embodiments of the TOBI assemblies may include that the filter holes have a hole diameter between 0.025 and 0.030 inches.

In addition to one or more of the features described above, or as an alternative, further embodiments of the TOBI assemblies may include that the at least one feed hole has a hole diameter that is two to ten times larger than a hole diameter of the filter holes.

In addition to one or more of the features described above, or as an alternative, further embodiments of the TOBI assemblies may include that the filter portion is formed from a mesh material.

In addition to one or more of the features described above, or as an alternative, further embodiments of the TOBI assemblies may include that the at least one feed hole is aligned with the inlet to the TOBI.

In addition to one or more of the features described above, or as an alternative, further embodiments of the TOBI assemblies may include that the second blocker plate and the third blocker plate are portions of a single sheet of material.

In addition to one or more of the features described above, or as an alternative, further embodiments of the TOBI assemblies may include at least one auxiliary blocker plate arranged within the blocker cavity between the second blocker plate and the third blocker plate.

In addition to one or more of the features described above, or as an alternative, further embodiments of the TOBI assemblies may include that the at least one auxiliary blocker plate is attached to a portion of the third blocker plate.

According to some embodiments, gas turbine engines are provided. The gas turbine engines include a compressor section and a turbine section arranged axially along an engine axis and a tangential onboard injector assembly arranged forward of the turbine section and comprising a tangential onboard injector (TOBI) having an inlet and an outlet and a TOBI blocker assembly arranged upstream from the TOBI. The TOBI blocker assembly includes a first blocker plate mounted upstream from the inlet of the TOBI and defining a blocker cavity between the first blocker plate and the inlet of the TOBI, the first blocker plate comprising a blocking portion and a filter portion, wherein air is blocked from entering the blocker cavity through the blocking portion and permitted to enter the blocker cavity through the filter portion, a second blocker plate arranged within the blocker cavity to obstruct a flow of air containing particulate matter flowing from the filter portion to the inlet of the TOBI, wherein a gap is present between the second blocker plate and the first blocker plate to permit flow of air around the second blocker plate to the TOBI, and a third blocker plate arranged downstream from the second blocker plate and within the blocker cavity, the third blocker plate comprising at least one feed hole, wherein air within a region between the second blocker plate and the third blocker plate will flow through the at least one feed hole and into the TOBI.

In addition to one or more of the features described above, or as an alternative, further embodiments of the gas turbine engines may include that the filter portion comprises a plurality of filter holes.

In addition to one or more of the features described above, or as an alternative, further embodiments of the gas turbine engines may include that the filter holes have a hole diameter between 0.025 and 0.030 inches.

In addition to one or more of the features described above, or as an alternative, further embodiments of the gas turbine engines may include that the at least one feed hole has a hole diameter that is two to ten times larger than a hole diameter of the filter holes.

In addition to one or more of the features described above, or as an alternative, further embodiments of the gas turbine engines may include that the at least one feed hole is aligned with the inlet to the TOBI.

In addition to one or more of the features described above, or as an alternative, further embodiments of the gas turbine engines may include that the second blocker plate and the third blocker plate are portions of a single sheet of material.

In addition to one or more of the features described above, or as an alternative, further embodiments of the gas turbine engines may include that the TOBI blocker assembly is a full-hoop structure arranged about the engine axis.

In addition to one or more of the features described above, or as an alternative, further embodiments of the gas turbine engines may include at least one auxiliary blocker plate arranged within the blocker cavity between the second blocker plate and the third blocker plate.

In addition to one or more of the features described above, or as an alternative, further embodiments of the gas turbine engines may include that the at least one auxiliary blocker plate is attached to a portion of the third blocker plate.

In addition to one or more of the features described above, or as an alternative, further embodiments of the gas turbine engines may include that the at least one auxiliary blocker assembly is arranged axially in front of the at least one feed hole.

In addition to one or more of the features described above, or as an alternative, further embodiments of the gas turbine engines may include that the at least one auxiliary blocker assembly is arranged at a position below the engine axis.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
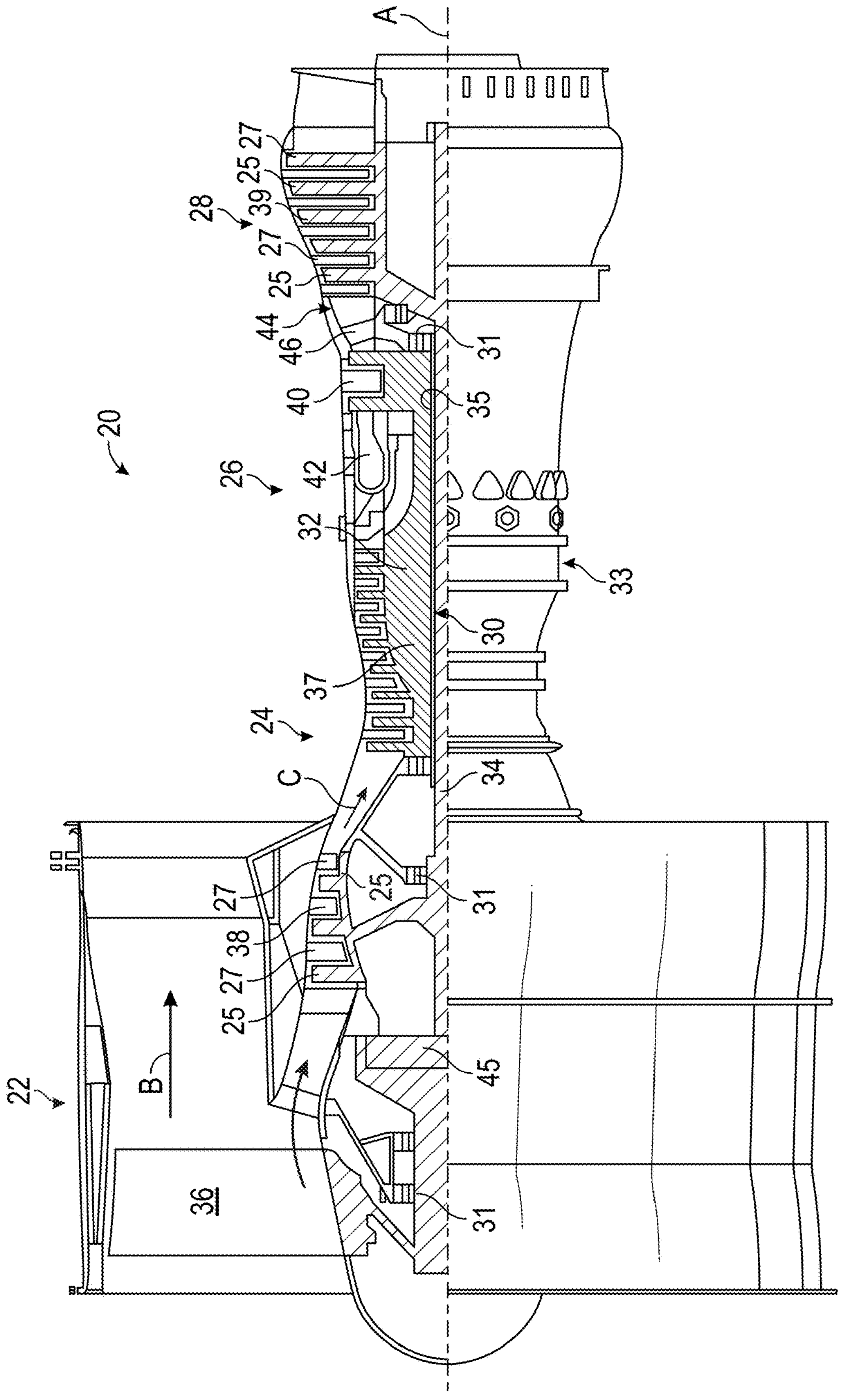
FIG. 1 is a schematic cross-sectional illustration of an aircraft turbine engine that may incorporate embodiments disclosed herein.

FIG. 1 schematically illustrates a gas turbine engine 20. The illustrative, example gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. The core flow path C directs compressed air into the combustor section 26 for combustion with a fuel. Hot combustion gases generated in the combustor section 26 are expanded through the turbine section 28. Although depicted as a turbofan gas turbine engine, it should be understood that the concepts described herein are not limited to turbofan engines and these teachings could extend to other types of engines.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low-pressure compressor 38 and a low-pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high-pressure compressor 37 and a high-pressure turbine 40. In this embodiment, the inner shaft 34 and the outer shaft 35 are supported at various axial locations by bearing systems 31 positioned within the engine static structure 33.

A combustor 42 is arranged between the high-pressure compressor 37 and the high-pressure turbine 40. A mid-turbine frame 44 may be arranged generally between the high-pressure turbine 40 and the low-pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low-pressure compressor 38 and the high-pressure compressor 37, is mixed with fuel and burned in the combustor 42 and is then expanded across the high-pressure turbine 40 and the low-pressure turbine 39. The high-pressure turbine 40 and the low-pressure turbine 39 rotationally drive the respective high-speed spool 32 and the low-speed spool 30 in response to the expansion.

The pressure ratio of the low-pressure turbine 39 can be pressure measured prior to the inlet of the low-pressure turbine 39 as related to the pressure at the outlet of the low-pressure turbine 39 and prior to an exhaust nozzle of the gas turbine engine 20. In one non-limiting embodiment, a bypass ratio of the gas turbine engine 20 is greater than about ten (10:1), the fan diameter is significantly larger than that of the low-pressure compressor 38, and the low-pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In an embodiment of the gas turbine engine 20, a significant amount of thrust may be provided by the bypass flow path B due to the high bypass ratio. The fan section 22 of the gas turbine engine 20 is designed for a particular flight condition-typically cruise at about 0.8 Mach and about 35,000 feet (10,668 meter). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram}° R)/(518.7° R)]^{0.5}$, where $T_{ram}$ represents the ambient temperature in degrees Rankine. The Low Corrected Fan Tip Speed according to one non-limiting embodiment of the example gas turbine engine 20 is less than about 1150 feet per second (fps) (351 meters per second (m/s)).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 2A:
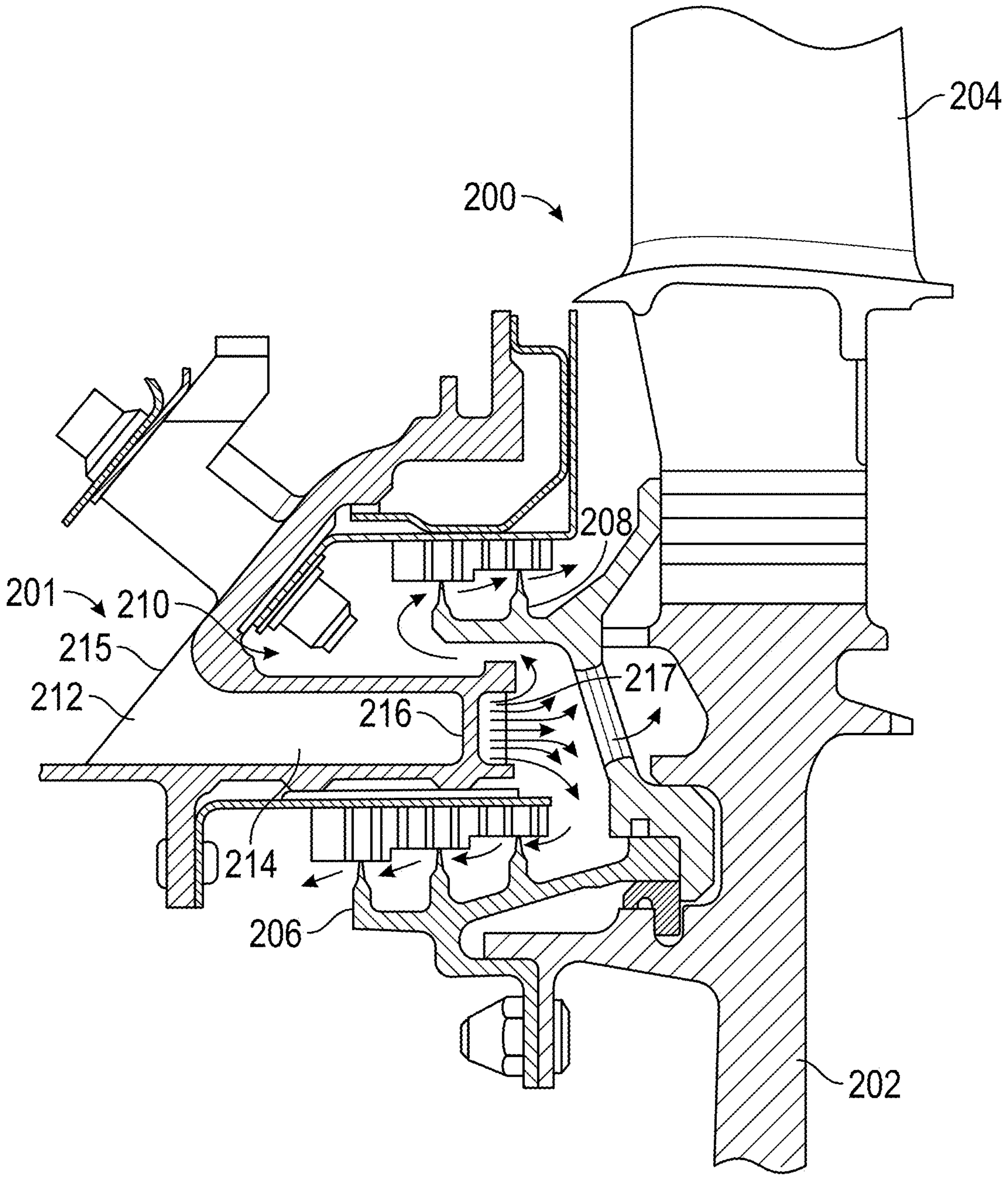
FIG. 2A is a schematic illustration of a portion of a gas turbine engine having a tangential on-board injector ("TOBI") that may employ one or more embodiments described herein.

FIG. 2A is a schematic illustration of a portion of a turbine 200 of a gas turbine engine having a tangential on-board injector 201 ("TOBI 201") that may incorporate embodiments of the present disclosure. During operation, air discharging from the TOBI 201 is delivered into a cavity just ahead (forward) of a portion of the turbine 200. The cavity is typically sealed off by one or more seals that interface between a rotating structure and a non-rotating structure of the gas turbine engine. Air may escape or pass through the one or more seals in the form of leakage. The arrows in FIG. 2A illustrate a cooling air flow discharging from the TOBI 201 and illustrates how the cooling air is distributed around and through a turbine portion of the gas turbine engine. As shown, the turbine 200 (partially shown) includes a disk 202 supporting a plurality of circumferentially spaced blades 204 (one being shown). A first seal 206 and a second seal 208 are configured to define an annular cavity 210 just ahead (forward) of the turbine 200. A body 212 of the TOBI 201 defines a passageway 214 that is configured to receive compressor discharge air and deliver the air to the turbine 200 through a plurality of nozzles 216. The body 212 has an entrance 215 at a forward end and an exit 217 at a downstream or aft end, with the nozzles 216 configured at the exit 217 of the body 212.

Figure 2B:
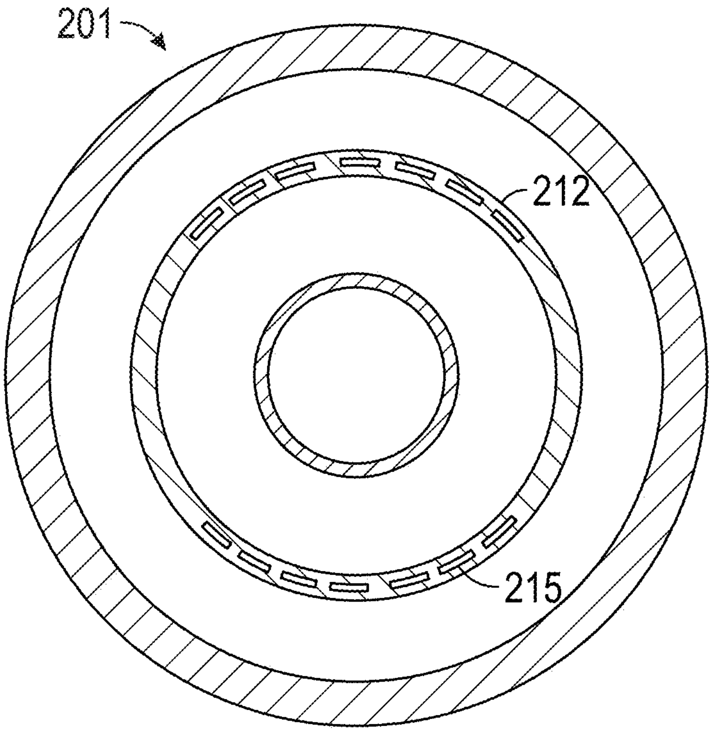
FIG. 2B is a baseline view of the TOBI of FIG. 2A.
Figure 2C:
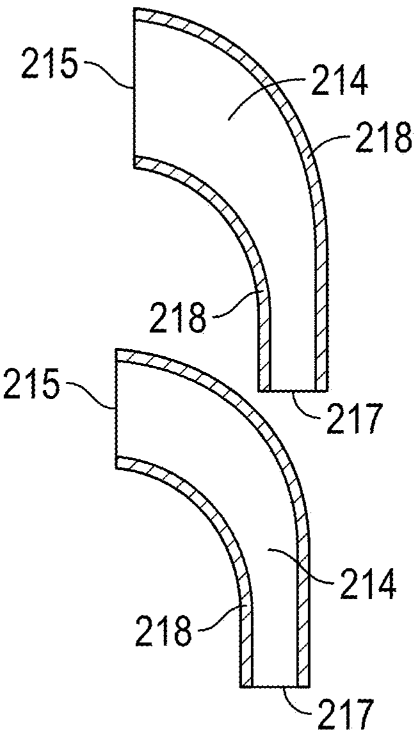
FIG. 2C, shows a top-down view of two adjacent passageways of the TOBI of FIG. 2A.

FIG. 2B is a baseline or axial view of the TOBI 201 of FIG. 2A. As shown, a plurality of entrances 215 may be formed in the body 212 of the TOBI 201. Although shown with entrances 215 covering 180° of the body 212 of the TOBI 201, those of skill in the art will appreciate that entrances 215 may cover up to a full 360° of the body 212 of the TOBI 201, or other amount of the TOBI 201. Further, although shown in two distinct groups (e.g., upper and lower), it will be appreciated that any number of groups, having any number of entrances 215 may be distributed circumferentially about the body 212 of the TOBI 201, without departing from the scope of the present disclosure. FIG. 2C, illustrates a top-down view of two adjacent passageways 214 of the TOBI 201, illustrating the shape and narrowing of the passageways 214 of the TOBI 201.

Air is directed into the entrance 215 of the TOBI 210 from an outer combustor flowpath. The source of the air may be from a forward arranged compressor section (e.g., as shown in FIG. 1). Air from the compressor section (e.g., high pressure compressor) is directed around the combustor structure and directed into the entrances 215 of the TOBI 201. The cooling air then passes through the TOBI 201 and directed to provide cooling to the turbine 200 (e.g., blades and discs thereof). The cooling air may purge a forward rim cavity (e.g., annular cavity 210 and/or surrounding cavities).

Air entering the engine can have dirt, which will flow through the compressor section and may be carried in the cooling air that is directed to the TOBI 201. For example, sand, dust, and other particles may be carried by the cooling flow and may collect at each entrance 215 to the TOBI 201 and/or within the passageways 214 of the TOBI 201. That is, dirt, debris, domestic object debris (e.g., from the engine itself), foreign object debris (e.g., from external to the engine), etc., referred to herein as particulate matter may be carried by an airflow that is directed into and through the TOBI 201. Dirt, debris, and foreign object debris may be pulled into the engine during use by operation of the fan and compressor. Further, for example, during a rub event, rubstrip material in the compressor section may be worn away, thus generating domestic object debris. During operation, the particulate matter and/or particulate matter agglomeration can dislodge and travel to the entrance 215 to the TOBI 201. The particulate matter in the flowpath, and which enters the TOBI 201, can contaminate the cooling and purge flows through downstream components (e.g., blades and vanes of a turbine section), which can subsequently interfere with the cooling of the respective components. Reduction in cooling effectiveness can reduce the durability of the turbine. The particles may thus interfere with the operation of the gas turbine engine. Further example, particulate matter may settle in or on the TOBI 201 when the engine is shut down, and then the settled particulate matter may be sucked into the TOBI 201 during a start-up operation. Such particle matter may thus be pulled into and through the cooling air flow, and potentially may be directed into or at a blade or vane of the turbine 200 and/or other downstream components. Such particulate matter can plug cooling holes and apertures of the blade which can result in significant part-life reduction of the airfoil.

Accordingly, in order to increase the part-life of turbine components and ensure proper cooling flow through a TOBI, and to provide other advantages and feature, embodiments of the present disclosure are directed to a tangential on-board injector shield or blocker that is arranged to prevent the particulate matter from entering and/or flowing through the TOBI. The TOBI blocker assemblies and systems described herein may be formed from one or more structures that provide a fluid flow path through the structure(s) while preventing or reducing the amount of particulate matter from entering the TOBI.

Figure 3A:
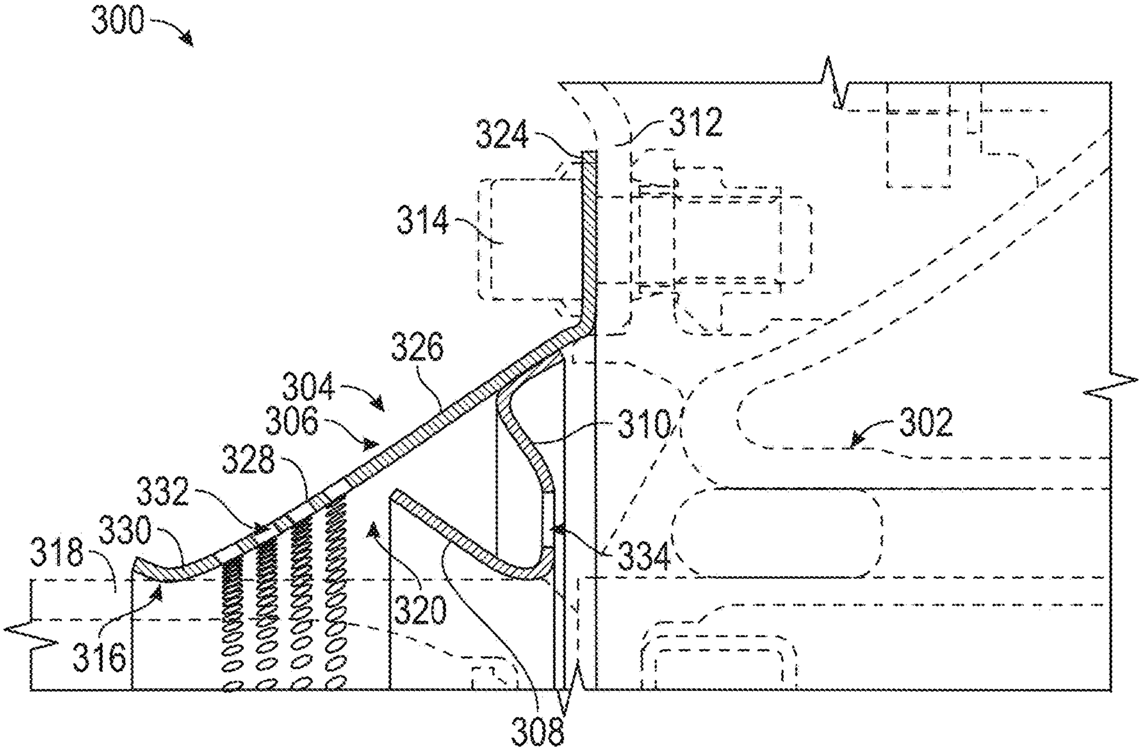
FIG. 3A is a schematic illustration of a TOBI assembly having a TOBI blocker assembly arranged therewith.
Figure 3B:
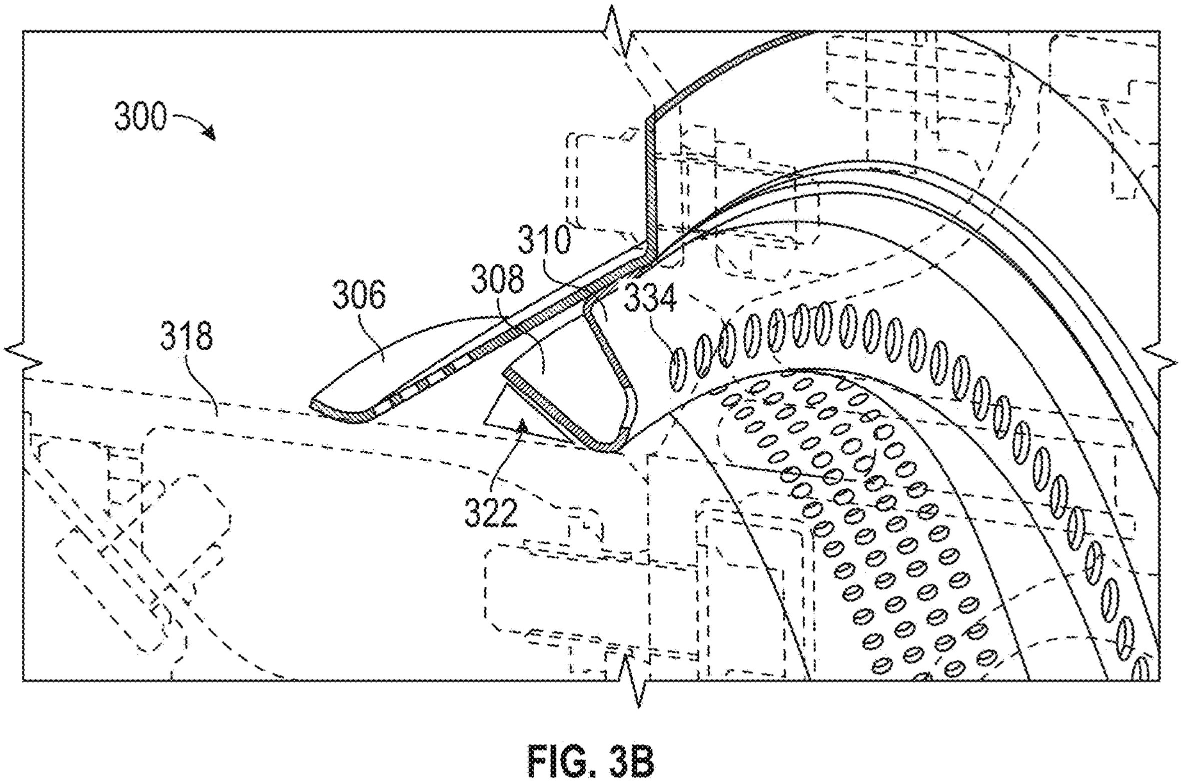
FIG. 3B is another view of the TOBI assembly of FIG. 3A.

Referring to FIGS. 3A-3B, schematic illustrations of a TOBI assembly 300 in accordance with an embodiment of the present disclosure are shown. The TOBI assembly 300 includes a TOBI 302 arranged similar to that shown and described above with respect to FIGS. 2A-2C. Arranged forward (relative to a cooling flow into the TOBI 302) is a TOBI blocker assembly 304. The TOBI blocker assembly 304, in this illustrative configuration, includes a first blocker plate 306, a second blocker plate 308, and a third blocker plate 310. Each of the blocker plates 306, 308, 310 are annular structures or full hoop structures. The first blocker plate 306 is fixedly attached to a first engine structure 312 of the gas turbine engine by a fastener 314 at an aft end and by an interference fit 316 with a second engine structure 318 at a forward end. In some non-limiting embodiments, the first engine structure 312 may be a combustor support flange or other combustor support structure and the second engine structure 318 may be an inner case of the engine. It will be appreciated that the first blocker plate 306 may be mounted and/or affixed relative to the TOBI 302 by other means known in the art, and the illustrative configuration is not intended to be limiting.

As shown, the second blocker plate 308 and the third blocker plate 310 are illustrated as a unitary body. However, in other configurations, the second blocker plate 308 and the third blocker plate 310 may be formed as two separate and distinct structures. The structure of the second and third blocker plates 308, 310 may be attached to the first blocker plate 306, such as by welding, bonding integral forming, adhesives, fasteners, or the like. In some embodiments, the structure of the second and third blocker plates 308, 310 may be attached to the first engine structure 312 by welding, bonding, fastener, adhesives, or the like. Further, in some embodiments, a portion of the structure of the second and third blocker plates 308, 310 may have an interference fit with the second engine structure 318. As shown, the second blocker plate 308 and the third blocker plate 310 are arranged within a blocker cavity 320 defined between the first blocker plate 306 and the TOBI 302. In operation, particulate matter 322 will collect within the blocker cavity 320 and will be prevented from entering the TOBI 302 and passing downstream to interact with other components of the engine. The arrangement of the blocker plates 306, 308, 310 define a tortuous path which is arranged to allow gas to flow through the TOBI blocker assembly 304 but prevents at least a portion of the particulate matter 322 from passing into and through the TOBI 302.

The first blocker plate 306 includes a first mounting portion 324, a blocking portion 326, a filter portion 328, and a second mounting portion 330. The first mounting portion 324 is configured to receive one or more of the fasteners 314 and is arranged to be secured to the first engine structure 312 by the fasteners 314. As such, the first mounting portion 324 may be a substantially solid plate with a apertures for receiving the fasteners 314. In other embodiments, the first mounting portion 324 may be affixed to the first engine structure 312 by other means, including, without limitation, adhesives, bonding, welding, interference fit, or other means or mechanism, as will be appreciated by those of skill in the art. Extending at an angle from the first mounting portion 324 is the blocking portion 326 and the filter portion 328. In this configuration, the blocking portion 326 and the filter portion 328 are part of a single or continuous sheet of material, with the blocking portion 326 being solid and the filter portion 328 having filter holes 332 formed therein. As a non-limiting example, the filter holes 332 may have diameters of 0.025 to 0.030 inches. Such small diameter filter holes 322 will prevent particulate matter having a size greater than the hole size from passing through the filter portion 328 and thus prevent such particulate matter from entering the blocker cavity 320. Particles smaller than the diameter size of the filter holes 332 may be carried by a cooling flow that passes through the filter holes 332 and enters the blocker cavity 320.

The particulate matter 322 that passes through the filter holes 332 may be blocked or prevented from passing toward the TOBI 302 due to the second blocker plate 308. The second blocker plate 308 is arranged in a forward angled orientation. For example, relative to an axis through an engine, the first blocker plate 306 is angled radially inward (toward the central axis) and extending axially forward relative to the TOBI 302 (i.e., extending way from the TOBI 302 in a direction of an engine axis). In contrast, relative to the engine axis, the second blocker plate 308 extends radially outward and axially forward relative to the TOBI 302. As described herein, a gap is defined between the first blocker plate 306 and the second blocker plate 308. As such, a forward portion of the blocker cavity 320 is defined by the filter portion 328 of the first blocker plate 306, the second blocker plate 308, and a portion of the second engine structure 318. As air and small particulate matter (particles that fit through the filter holes 332) enters the forward portion of the blocker cavity 320, the air will swirl within the forward portion of the blocker cavity 320 and then flow through gap and around the second blocker plate 308 to enter an after portion of the blocker cavity 320. The aft portion of the blocker cavity is defined by the blocking portion 326 of the first blocker plate 306, the second blocker plate 308, and the third blocker plate 310. The particulate matter 322 that enters the forward portion of the blocker cavity 320 will be prevented from flowing around an end of the second blocker plate 308 and will be captured within the forward portion of the blocker cavity 320. The clean air will flow through the gap around the second blocker wall 308 and enter the aft portion of the blocker cavity 320. The air may then pass through one or more feed holes 334 which provide fluid access to the TOBI 302. As such, particulate matter 322 (and larger particles stopped by the filter portion 328) is prevented from entering the TOBI 302 and flowing downstream to interact with downstream components of the engine.

In some embodiments, the feed holes 334 may be formed within the third blocker plate 310. In other embodiments, the feed holes 334 may be formed on a discrete structure or plate that is attached to the second blocker plate 308 and/or the third blocker plate 310. As noted above, the second blocker plate 308 and the third blocker plate 310 may be formed as a single, bent or formed sheet of material, and the feed holes 334 may be formed on the sheet of material between the second blocker plate 308 and the third blocker plate 310. The feed holes 334 are positioned to align with an entrance or inlet to the TOBI 302. In some non-limiting embodiments, the size of the filter holes 332 may be smaller than the size of the feed holes 334. For example, and without limitation, the feed holes 334 may be two (2) to ten (10) times larger in diameter than the filter holes 332. In some embodiments, the total volume of open space defined by the filter holes 332 may be equal to or greater than the total volume of open space defined by the feed holes 334, thus ensuring sufficient airflow to be supplied to the TOBI 302 and other downstream components to be cooled by such airflow.

Figure 4:
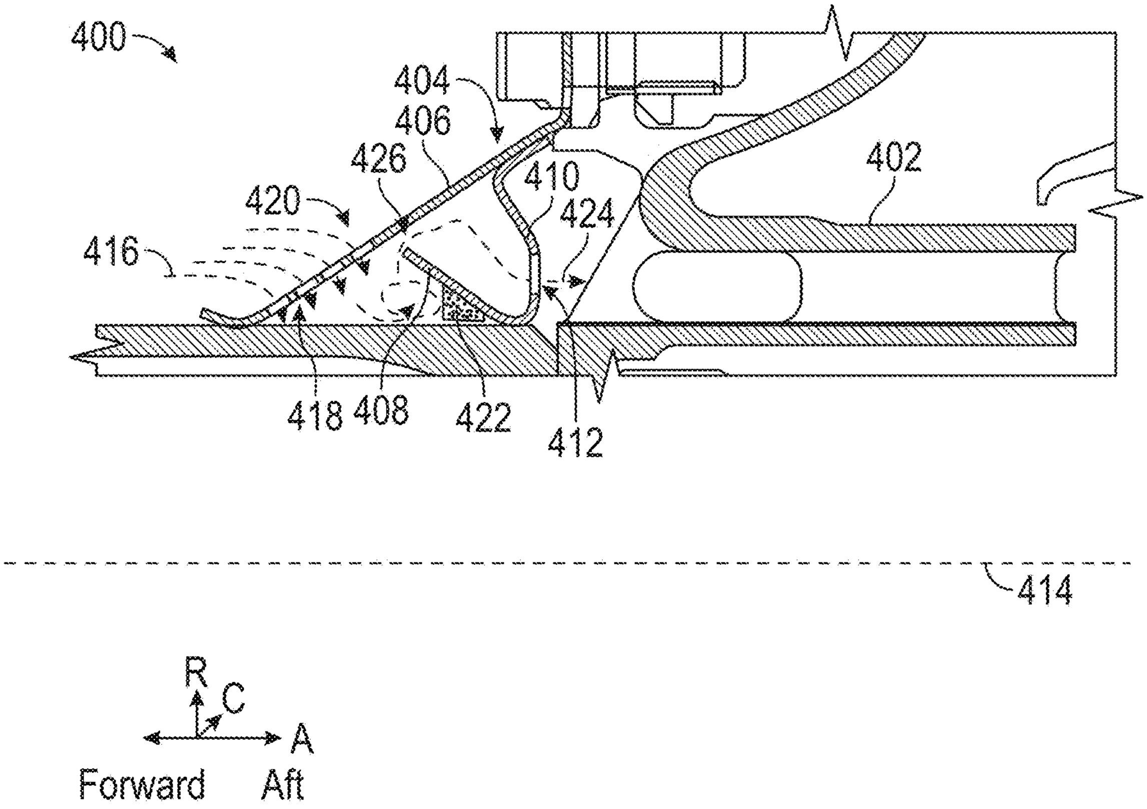
FIG. 4 is a schematic illustration of a TOBI assembly having a TOBI blocker assembly arranged therewith illustrating a configuration located above an engine axis.

Referring to FIG. 4, a schematic illustration of a TOBI assembly 400 in accordance with an embodiment of the present disclosure is shown. The TOBI assembly 400 includes a TOBI 402 arranged similar to that shown and described above. Arranged forward (relative to a cooling flow into the TOBI 402) is a TOBI blocker assembly 404. The TOBI blocker assembly 404, in this illustrative configuration, includes a first blocker plate 406, a second blocker plate 408, and a third blocker plate 410 having feed holes 412 arranged relative to and aligned with an entrance to the TOBI 402. The TOBI blocker assembly 404 is arranged substantially similar to that shown and described in FIGS. 3A-3B. As shown in FIG. 4, the TOBI blocker assembly 404 is shown above an engine axis 414. The engine axis 414 is an axis through a centerline of an engine, such as engine centerline longitudinal axis A shown in FIG. 1. In FIG. 4, an axial direction A is along or parallel with the engine axis 414, a radial direction R is normal to the axial direction A, and a circumferential direction C (or tangential direction) is a direction about a circumference of the engine axis 414. In the radial direction R, radially outward means a direction away from the axis 414 and radially inward means a direction toward the axis 414. Because the TOBI blocker assembly 404 is a fixed or static structure that is mounted to the engine case and/or engine static structure, the flow of air around the TOBI blocker assembly 404 will be different at the upper portion (above the engine axis 414) relative to the lower portion (below the engine axis 414). As a result, gravity will act downward on particulate matter passing through the portion of the TOBI blocker assembly 404 and pull the particulate matter toward the engine axis 414.

FIG. 4 illustrates a flow of cooling air through the TOBI blocker assembly 404. As shown, air containing particulate matter 416 will flow through filter holes 418 of a filter portion 420 of the first blocker plate 406. Large particles (e.g., larger than a diameter size of the filter holes 418) is prevented from passing through the first blocker plate 406. As the air enters the blocker cavity defined by the TOBI blocker assembly 404, as described above, particulate matter 422 will be captured against the second blocker plate 408. As a result, relatively clean air 424 will flow around the second blocker plate 408 though a gap 426 defined between an end of the second blocker plate 408 and the first blocker plate 406. and pass through the feed holes 412 formed in the third blocker plate 410. The clean air 424 will then flow into and through the TOBI 402.

Figure 5:
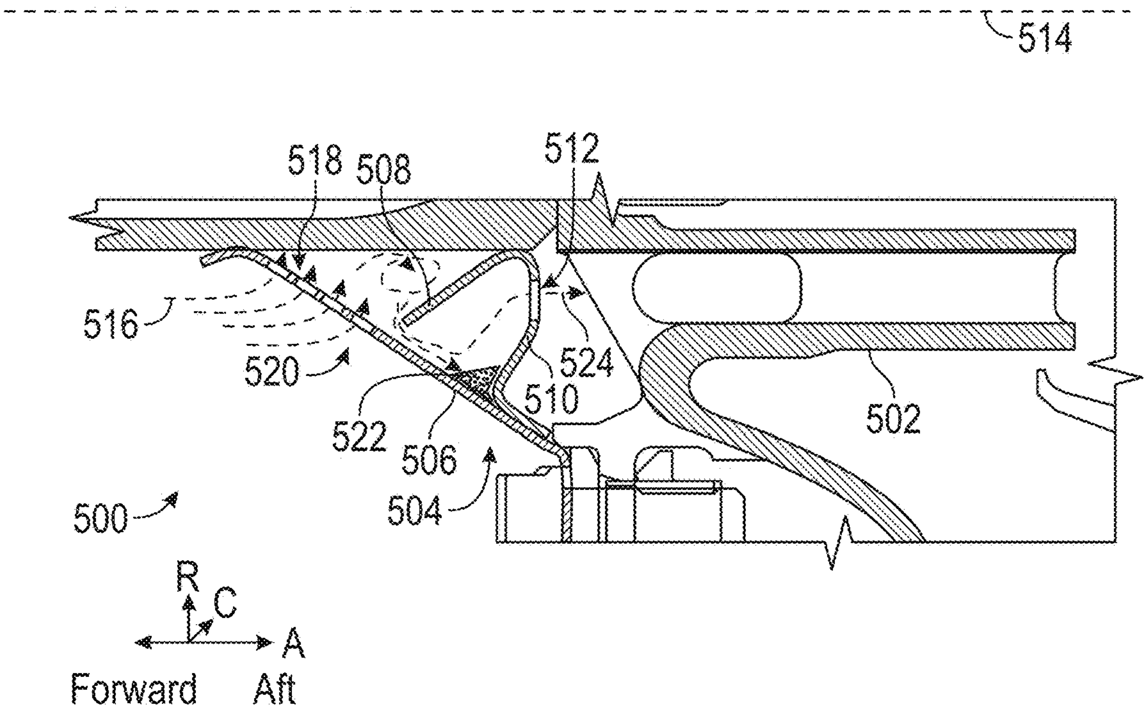
FIG. 5 is a schematic illustration of a TOBI assembly having a TOBI blocker assembly arranged therewith illustrating a configuration located below an engine axis.

Referring to FIG. 5, a schematic illustration of a TOBI assembly 500 in accordance with an embodiment of the present disclosure is shown. The TOBI assembly 500 includes a TOBI 502 arranged similar to that shown and described above. Arranged forward (relative to a cooling flow into the TOBI 502) is a TOBI blocker assembly 504. The TOBI blocker assembly 504, in this illustrative configuration, includes a first blocker plate 506, a second blocker plate 508, and a third blocker plate 510 having feed holes 512 arranged relative to and aligned with an entrance to the TOBI 502. The TOBI blocker assembly 504 is arranged substantially similar to that shown and described above. As shown in FIG. 5, the TOBI blocker assembly 504 is shown below an engine axis 514. FIG. 5 has the same directional arrangement as that described in FIG. 4 (e.g., an axial direction A, a radial direction R, and a circumferential direction C (or tangential direction) as labeled in FIG. 5). The portion of the TOBI blocker assembly 504 may represent another portion of the same or similar TOBI blocker assembly 404 shown in FIG. 4, with the TOBI blocker assembly 504 being below the engine axis. Because the TOBI blocker assembly 504 is a fixed or static structure that is mounted to the engine case and/or engine static structure, the flow of air around the TOBI blocker assembly 504 will be different at the lower portion (below the engine axis 514) relative to the upper portion (above the engine axis 514 (e.g., as shown in FIG. 4)). As a result, gravity will act downward on particulate matter passing through the portion of the TOBI blocker assembly 504 and pull the particulate matter away from the engine axis 514.

FIG. 5 illustrates a flow of cooling air through the TOBI blocker assembly 504. As shown, air containing particulate matter 516 will flow through filter holes 518 of a filter portion 520 of the first blocker plate 506. Large particles (e.g., larger than a diameter size of the filter holes 518) is prevented from passing through the first blocker plate 506. As the air enters the blocker cavity defined by the TOBI blocker assembly 504, as described above, the air will swirl in a forward cavity portion due to the second blocker plate 508. As such, the air velocity of the air 516 will be slowed and particulate matter 522 may fall out of the air will be captured against the third blocker plate 510. In this position, the air containing the particulate matter 522 will flow around the second blocker plate 508 through a gap defined between the second blocker plate 508 and the first blocker plate 506. Relatively clean air 524, having a relatively slow velocity, will continue to flow upward (radially inward) along the third blocker plate 510 and pass through the feed holes 512 formed in the third blocker plate 510. The clean air 524 will then flow into and through the TOBI 502.

As noted, the configuration of FIG. 4 and the configuration of FIG. 5 may be representative of a single engine configuration. In such a configuration, the portion of the TOBI blocker assembly shown in FIG. 4 is the upper portion relative to an engine axis and the portion shown in FIG. 5 is the lower portion relative to the engine axis. It will be appreciated that the gap (gap 426 shown in FIG. 4) may have clean air pass therethrough in the upper portion, but a combination of air and particulate matter will pass through the gap in the lower portion of the TOBI blocker assembly. In the full hoop configuration, the second blocker plate is arranged radially inward relative to the first blocker plate. Moreover, as shown, the feed holes are arranged radially inward relative to the third blocker plate. This configuration allows for the capture of particulate matter both above and below the engine axis.

Figure 6:
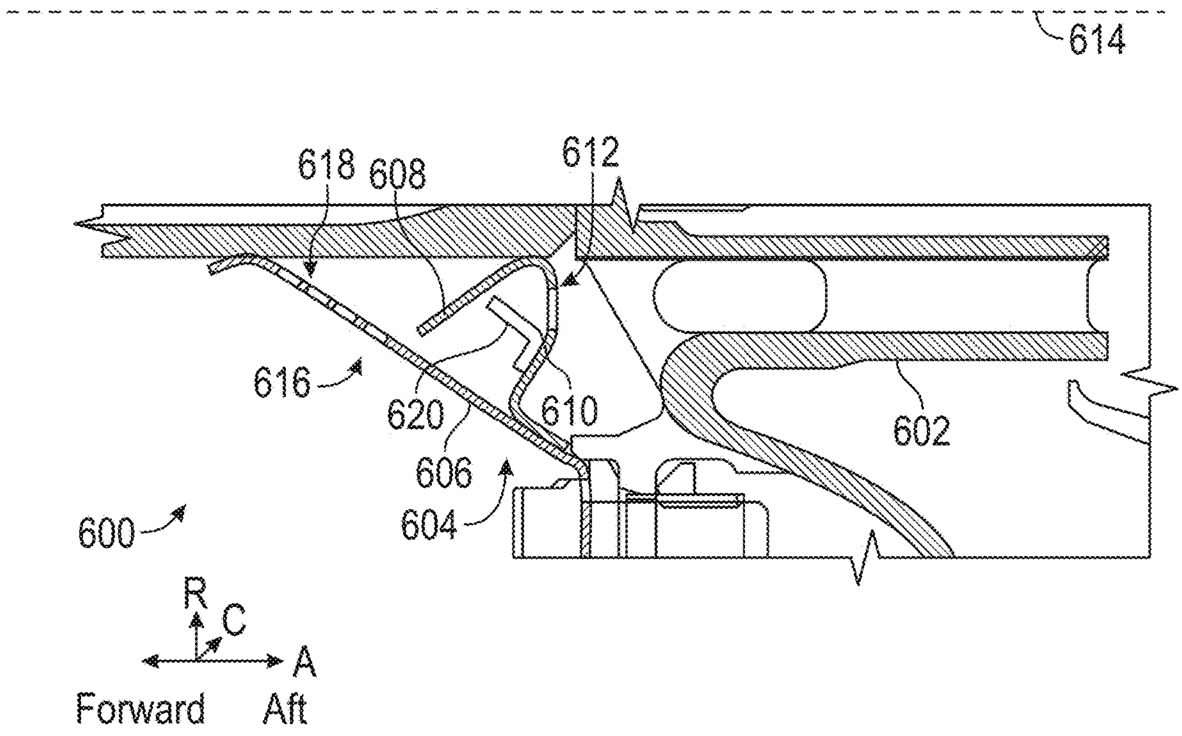
FIG. 6 is a schematic illustration of another configuration of a TOBI assembly having a TOBI blocker assembly arranged therewith illustrating a configuration located below an engine axis.

Referring to FIG. 6, a schematic illustration of a TOBI assembly 600 in accordance with an embodiment of the present disclosure is shown. The TOBI assembly 600 includes a TOBI 602 arranged similar to that shown and described above. Arranged forward (relative to a cooling flow into the TOBI 602) is a TOBI blocker assembly 604. The TOBI blocker assembly 604, in this illustrative configuration, includes a first blocker plate 606, a second blocker plate 608, and a third blocker plate 610 having feed holes 612 arranged relative to and aligned with an entrance to the TOBI 602. The TOBI blocker assembly 604 is arranged substantially similar to that shown and described with respect to FIG. 5. That is, the TOBI blocker assembly 604 is shown arranged below an engine axis 614.

Similar to the embodiment of FIG. 5, the first blocker plate 606 includes a filter portion 616 having a plurality of filter holes 618. The second blocker plate 608 is arranged within a blocker cavity and arranged as described above. As noted above relative to the portions of the TOBI blocker assembly 604 arranged below the engine axis 614. As discussed with respect to the configuration of FIG. 5, the particulate matter will fall into the region aft of and radially outward from the second blocker plate 608. To prevent the particulate matter from being pulled into and through the feed hole 612, the TOBI blocker assembly 604 includes an auxiliary blocker plate 620. The auxiliary blocker plate 620 is arranged to extend substantially parallel with the first blocker plate 606 and is arranged between the second blocker plate 608 and the third blocker plate 610. The auxiliary blocker plate 620 may be fixedly attached to or part of the third blocker plate 610. In some configurations, the auxiliary blocker plate 620, unlike the other blocker plates 606, 608, 610, may not be a full-hoop structure. Rather, a partial hoop structure auxiliary blocker plate 620 may be arranged only at portions of the TOBI blocker assembly 604 that are below the engine axis 614. Further, in some embodiments, discrete auxiliary blocker plates 620 may be provided on the TOBI blocker assembly 604 below the engine axis 614 and aligned with the feed holes 612. That is, each feed hole 612 may have an associated auxiliary blocker plate 620 arranged upstream and forward of the feed hole 612. The auxiliary blocker plates 620 are configured to prevent particulate matter from being picked up and carried into and through the feed holes 612. The auxiliary blocker plates 620, in combination with a blocking portion of the first blocker plate 606, may define a trough or capture cavity to contain particulate matter and prevent further throughflow thereof.

The TOBI blocker assemblies of the present disclosure may be formed from sheet metal or the like. Various high temperature metals, as will be appreciated by those of skill in the art, may be used. In other configurations, high temperature composites may be employed to form some or all of the parts of the TOBI blocker assemblies. For example, in one non-limiting example, the first blocker plate may be formed from a metal material and the second and third blocker plates may be formed from a non-metal material (e.g., a composite or the like). The first blocker plate may be subject to the highest temperatures, and thus may be formed metal, with such metal first blocker plate shielding the second and third blocker plates from the highest temperatures.

With respect to the filter portions of the TOBI blocker assemblies, the filter holes of the filter portions may be drilled, etched, or otherwise formed holes that are manufactured through a solid sheet of material. In some embodiments, the filter portions may be formed from a screen material, a mesh material, a perforated sheet, or the like. In some embodiments, the filter portion may be formed separately from and attached to the blocking portion. As noted above, in accordance with some non-limiting configurations, the filter holes of the filter portion may have diameters of 0.025 to 0.030 inches. In some embodiments, the size of the filter holes may be set relative to the feed holes. For example, in some non-limiting embodiments, the feed holes may be two (2) to ten (10) times larger in diameter than the filter holes.

Further, although not show, in some configurations, seals may be provided at contact points between material of the TOBI blocker assemblies and material of the engine structure, case, and/or TOBI structure. Particulate matter that is larger than the filter hole diameter will be prevented from passing through the holes (e.g., above the engine axis) and/or may fall out due to gravity (e.g., below the ending axis).

Advantageously, embodiments described herein provide for improved cooling flow and TOBI operation for aircraft engines. Advantageously, TOBI blocker assemblies, as described herein, are configured to reduce or prevent particulate matter from flowing into and through a TOBI of the engine. As such, advantageously, cleaner air will be supplied to downstream components, such as blades and vanes of a turbine section of the engine.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of +8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A tangential onboard injector assembly comprising:

a tangential onboard injector (TOBI) having an inlet and an outlet; and a TOBI blocker assembly arranged upstream from the TOBI, the TOBI blocker assembly comprising:

a first blocker plate mounted upstream from the inlet of the TOBI and defining a blocker cavity between the first blocker plate and the inlet of the TOBI, the first blocker plate comprising a blocking portion and a filter portion, wherein air is blocked from entering the blocker cavity through the blocking portion and permitted to enter the blocker cavity through the filter portion;

a second blocker plate arranged within the blocker cavity to obstruct a flow of air containing particulate matter flowing from the filter portion to the inlet of the TOBI, wherein a gap is present between the second blocker plate and the first blocker plate to permit flow of air around the second blocker plate to the TOBI; and a third blocker plate arranged downstream from the second blocker plate and within the blocker cavity, the third blocker plate comprising at least one feed hole, wherein air within a region between the second blocker plate and the third blocker plate will flow through the at least one feed hole and into the TOBI.

2. The tangential onboard injector assembly of claim 1, wherein the filter portion comprises a plurality of filter holes.

3. The tangential onboard injector assembly of claim 2, wherein the filter holes have a hole diameter between 0.025 and 0.030 inches.

4. The tangential onboard injector assembly of claim 2, wherein the at least one feed hole has a hole diameter that is two to ten times larger than a hole diameter of the filter holes.

5. The tangential onboard injector assembly of claim 1, wherein the filter portion is formed from a mesh material.

6. The tangential onboard injector assembly of claim 1, wherein the at least one feed hole is aligned with the inlet to the TOBI.

7. The tangential onboard injector assembly of claim 1, wherein the second blocker plate and the third blocker plate are portions of a single sheet of material.

8. The tangential onboard injector assembly of claim 1, further comprising at least one auxiliary blocker plate arranged within the blocker cavity between the second blocker plate and the third blocker plate.

9. The tangential onboard injector assembly of claim 8, wherein the at least one auxiliary blocker plate is attached to a portion of the third blocker plate.

10. A gas turbine engine comprising:

a compressor section and a turbine section arranged axially along an engine axis; and a tangential onboard injector assembly arranged forward of the turbine section and comprising a tangential onboard injector (TOBI) having an inlet and an outlet and a TOBI blocker assembly arranged upstream from the TOBI, the TOBI blocker assembly comprising:

a first blocker plate mounted upstream from the inlet of the TOBI and defining a blocker cavity between the first blocker plate and the inlet of the TOBI, the first blocker plate comprising a blocking portion and a filter portion, wherein air is blocked from entering the blocker cavity through the blocking portion and permitted to enter the blocker cavity through the filter portion;

a second blocker plate arranged within the blocker cavity to obstruct a flow of air containing particulate matter flowing from the filter portion to the inlet of the TOBI, wherein a gap is present between the second blocker plate and the first blocker plate to permit flow of air around the second blocker plate to the TOBI; and a third blocker plate arranged downstream from the second blocker plate and within the blocker cavity, the third blocker plate comprising at least one feed hole, wherein air within a region between the second blocker plate and the third blocker plate will flow through the at least one feed hole and into the TOBI.

11. The gas turbine engine of claim 10, wherein the filter portion comprises a plurality of filter holes.

12. The gas turbine engine of claim 11, wherein the filter holes have a hole diameter between 0.025 and 0.030 inches.

13. The gas turbine engine of claim 11, wherein the at least one feed hole has a hole diameter that is two to ten times larger than a hole diameter of the filter holes.

14. The gas turbine engine of claim 10, wherein the at least one feed hole is aligned with the inlet to the TOBI.

15. The gas turbine engine of claim 10, wherein the second blocker plate and the third blocker plate are portions of a single sheet of material.

16. The gas turbine engine of claim 10, wherein the TOBI blocker assembly is a full-hoop structure arranged about the engine axis.

17. The gas turbine engine of claim 10, further comprising at least one auxiliary blocker plate arranged within the blocker cavity between the second blocker plate and the third blocker plate.

18. The gas turbine engine of claim 17, wherein the at least one auxiliary blocker plate is attached to a portion of the third blocker plate.

19. The gas turbine engine of claim 17, wherein the at least one auxiliary blocker assembly is arranged axially in front of the at least one feed hole.

20. The gas turbine engine of claim 17, wherein the at least one auxiliary blocker assembly is arranged at a position below the engine axis.

* * * * *